United States Patent
Haraguchi

(10) Patent No.: US 7,207,495 B2
(45) Date of Patent: Apr. 24, 2007

(54) WIRELESS TERMINAL TO WHICH AN INTEGRATED CIRCUIT CARD IS CONNECTED AND A SYSTEM UTILIZING THE WIRELESS TERMINAL FOR REWRITING MEMORY OF AN INTEGRATED CIRCUIT CARD

(75) Inventor: Shinya Haraguchi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/799,088

(22) Filed: Mar. 12, 2004

(65) Prior Publication Data

US 2004/0173675 A1 Sep. 9, 2004

Related U.S. Application Data

(62) Division of application No. 09/108,345, filed on Jun. 30, 1998, now abandoned.

(30) Foreign Application Priority Data

Jul. 3, 1997 (JP) .................... P9-177920

(51) Int. Cl.
*G06K 19/06* (2006.01)
(52) U.S. Cl. .............. 235/492; 235/375; 235/380
(58) Field of Classification Search ........ 235/379, 235/380, 381, 382, 382.5, 486, 492; 705/67, 705/68, 70
See application file for complete search history.

(56) References Cited

U.S. PATENT DOCUMENTS

| | | | |
|---|---|---|---|
| 4,736,094 A | 4/1988 | Yoshida | |
| 5,012,076 A * | 4/1991 | Yoshida | 235/379 |
| 5,144,115 A | 9/1992 | Yoshida et al. | |
| 5,521,363 A * | 5/1996 | Tannenbaum | 235/379 |
| 5,714,741 A * | 2/1998 | Pieterse et al. | 235/380 |
| 5,796,832 A | 8/1998 | Kawan | |
| 5,832,090 A * | 11/1998 | Raspotnik | 705/66 |
| 5,845,069 A * | 12/1998 | Tanaka | 713/200 |
| 5,936,220 A * | 8/1999 | Hoshino et al. | 235/380 |
| 5,993,047 A | 11/1999 | Novogrod et al. | |
| 6,012,049 A | 1/2000 | Kawan | |
| 6,016,956 A * | 1/2000 | Takami et al. | 235/380 |
| 6,062,472 A | 5/2000 | Cheung | |
| 6,064,988 A | 5/2000 | Thomas | |
| 6,213,392 B1 * | 4/2001 | Zuppicich | 235/380 |
| 6,311,167 B1 * | 10/2001 | Davis et al. | 705/35 |

FOREIGN PATENT DOCUMENTS

EP 0 950 968 A1 10/1999

OTHER PUBLICATIONS

Dialog file # 148, No. 09372340, "What Makes the Smartcard Smart?" by Francis Christian, Mass Transit, V22, N7, p. 56(1).

* cited by examiner

*Primary Examiner*—Ahshik Kim
(74) *Attorney, Agent, or Firm*—Lerner, David, Littenberg, Krumholz & Mentlik, LLP

(57) ABSTRACT

An integrated circuit card memory rewriting system comprises an integrated circuit card with built-in memory and a wireless terminal having an interface for being electrically connectable with the integrated circuit card. A base station is called by the wireless terminal while the integrated circuit card is being electrically connected to the interface of the wireless terminal. Data relating to internal data stored in the integrated circuit card is requested from the base station. The wireless terminal then updates the data of the memory of the integrated circuit card connected to the interface using received signals transmitted from the base station.

11 Claims, 3 Drawing Sheets

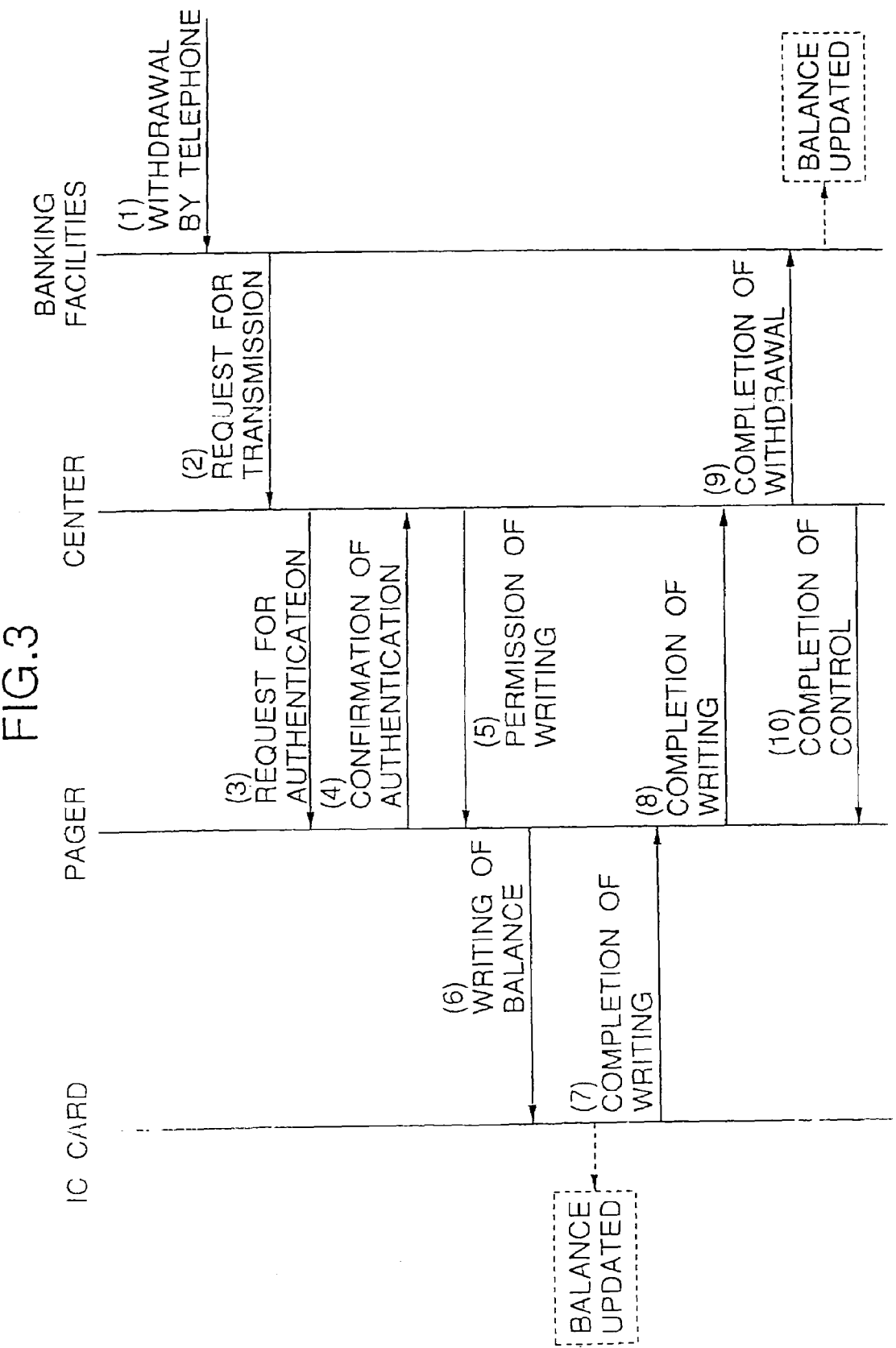

WIRELESS TERMINAL TO WHICH AN INTEGRATED CIRCUIT CARD IS CONNECTED AND A SYSTEM UTILIZING THE WIRELESS TERMINAL FOR REWRITING MEMORY OF AN INTEGRATED CIRCUIT CARD

RELATED APPLICATON

This application is a divisional application Ser. No. 09/108,345, filed on Jun. 30, 1998, now abandoned, the disclosure of which is incorporated by reference herein.

BACKGROUND OF THE INVENTION

1. Field of the Invention

The present invention relates to a portable terminal such as a two-way pager.

2. Description of Related Art

Electronic money systems employing Integrated Circuit (IC) cards have been considered. These IC cards have a memory built-in for storing data of a balance (a limited amount that can be paid-out using this IC card) in this IC card. If payments are then made using this IC card, the balance can be reduced just by the amount of this payment. Further, if a certain amount of a deposit in one's personal account in a financial institution such as a bank is withdrawn and the data of the amount is transferred to an IC card, the balance for the amount that can be paid out using the IC card can be increased and the data within the IC card can be updated.

Specifically, when an amount deposited in a financial institution is withdrawn and the data of the amount is transferred to an IC card, the following methods can be considered.

(1) An Automatic Teller Machine (hereinafter referred to as "ATM") installed in a financial institution or department store is used.

(2) The IC card is connected to a telephone line via a telephone adapter or an electronic wallet with a modem interface to access a financial institution.

However, when the balance data in an IC card is insufficient for making purchases using the IC card, there is a drawback in method (1) that deposit cannot be withdrawn so as to increase the balance data in the IC card if there is no ATM close to the shop and purchases therefore cannot be made. Further, in method (2), there is also a drawback that it is necessary to always carry a telephone adapter or an electronic wallet with a modem interface.

The present invention therefore sets out to resolve the above problems.

SUMMARY OF THE INVENTION

In order to resolve the aforementioned problems, according to the present invention, a system for rewriting memory of an integrated circuit card comprises an integrated circuit card with built-in memory and a wireless terminal having an interface for being electrically connectable with the integrated circuit card. The wireless terminal makes a call to a base station while the integrated circuit card is being electrically connected to the interface of the wireless terminal for requesting data relating to internal data stored in the integrated circuit card from the base station. The wireless terminal rewrites the data of the memory of the integrated circuit card connected to the interface using received signals transmitted from the base station.

Further, data of an amount of money can be stored as internal data at the integrated circuit card. The base station can then be connected with a financial institution and the data of the amount of money can be rewritten by the wireless terminal using data from the base station in accordance with a request from the financial institution.

Moreover, according to the present invention, a wireless terminal comprises an interface with an integrated circuit card having a memory, a receiver for receiving data relating to internal data of the integrated circuit card from a base station while the integrated circuit card is being connected to the wireless terminal via the interface and a controller for exerting control in such a manner that the internal data of the integrated circuit card is rewritten in accordance with a data signal received by the receiver.

Here, a display can be provided for carrying out displaying in accordance with the rewritten internal data of the integrated circuit card.

BRIEF DESCRIPTION OF THE DRAWINGS

FIG. 3 is a flowchart showing the embodiment of a procedure for updating a balance according to the present invention.

DETAILED DESCRIPTION OF THE PREFERRED EMBODIMENT

Figure 1:
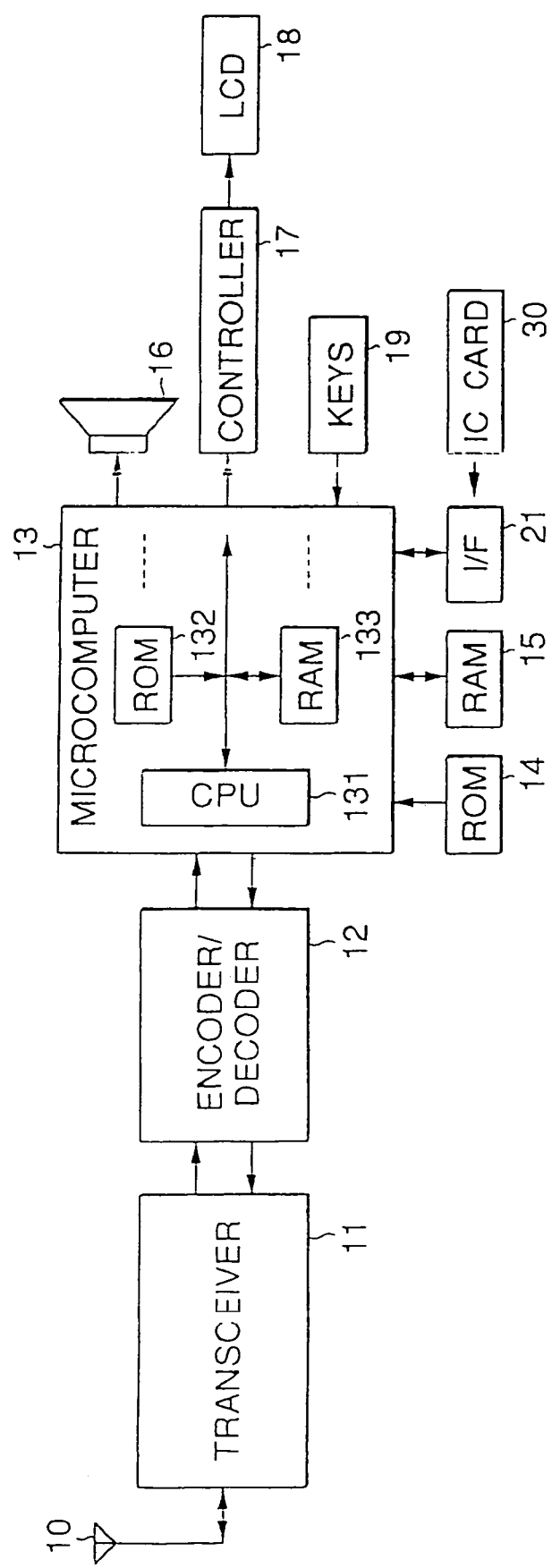
FIG. 1 is a system diagram showing an embodiment of the present invention.

FIG. 1 shows an embodiment of the present invention applied to a two-way pager. Here, an antenna 10 is connected to a transceiver 11. The transceiver 11 has a receiver and a transmitter and receives and demodulates radio signals transmitted from a center (pager base station) via the antenna 10 for outputting as prescribed data as well as converting various types of data to transmission signals transmitted to the center as radio signals via the antenna 10.

An encoder/decoder 12 processes data received and modulated by the transceiver 11 to be decoded and then outputs the decoded data as well as processing data for transmission to be encoded for being supplied to the transceiver 11.

Figure 2:
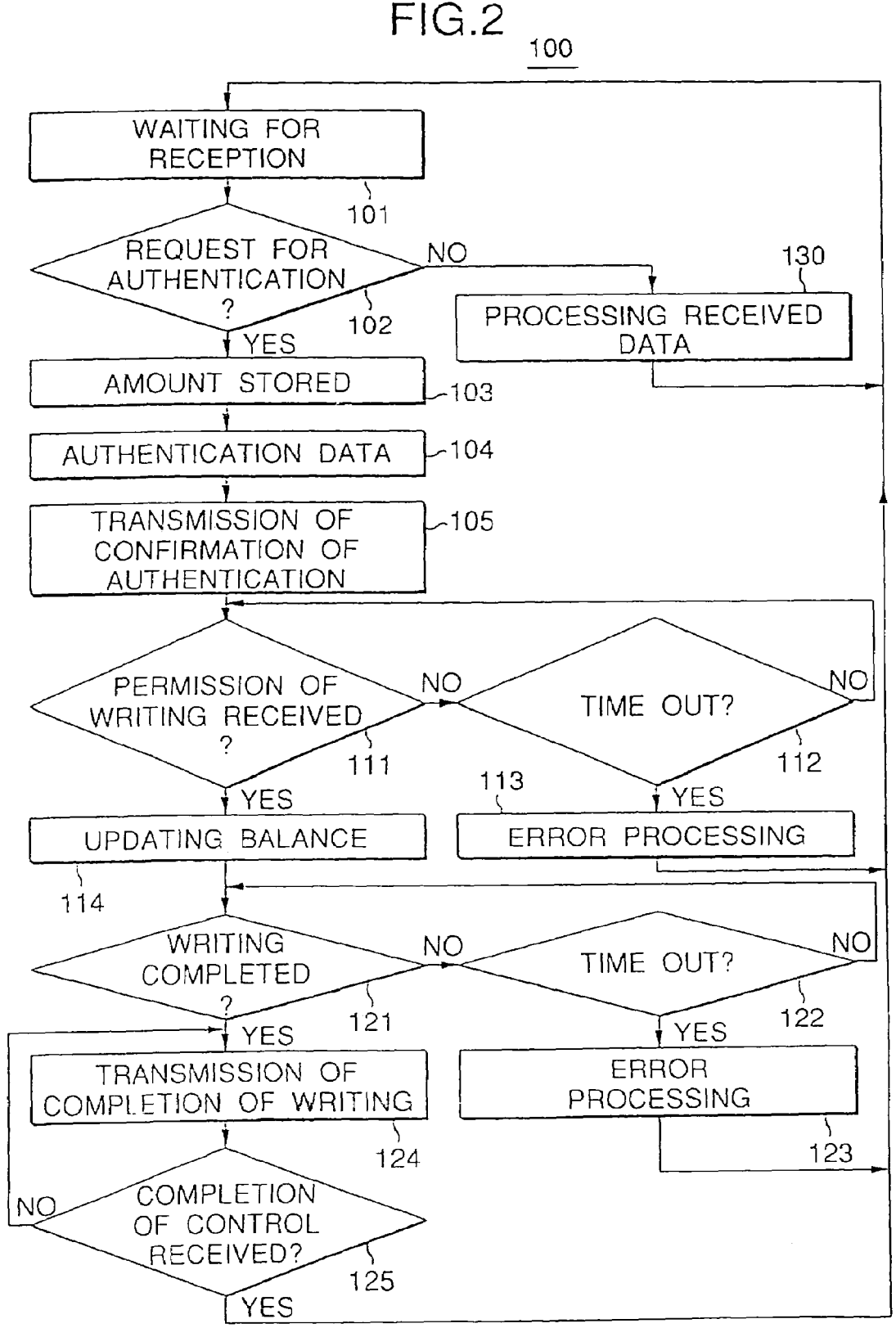
FIG. 2 is a flowchart showing the embodiment of the present invention.

A microcomputer 13 as a control means is for controlling operations of the pager etc. and has a CPU 131 for executing programs, a ROM 132 written with various programs, a RAM 133 used as a work area and various input/output circuits (not shown in the drawings). A balance routine 100 as shown, for example, in FIG. 2, is prepared as a part of a program at the ROM 132 and such processings as shown in FIG. 3 are executed. Details of these processings will be described in detail later and the portion relating to the present invention are extracted to be shown in the balance routine 100.

A ROM 14 written with an identification code (address information) is connected at the microcomputer 13 for identifying this pager and a RAM 15 is also connected to the microcomputer 13 for storing such data as received messages. An electromagnetic or piezoelectric speaker 16 is further connected to the microcomputer 13 for acoustically notifying the user (carrier) of calls to the pager.

A Liquid Crystal Display (LCD) 18 as a display element for displaying messages is connected to the microcomputer 13 via a display controller 17. Various operation keys (switches) 19 are connected to the microcomputer 13 for giving such instructions as inputting of messages to be transmitted and controlling displaying of received messages.

An IC card interface 21 is also connected to the microcomputer 13. This interface 21 is for connecting an IC card 30 to this pager and when, for example, the IC card 30 is inserted into this interface 21, the IC card 30 is connected to the microcomputer 13 so that signals can be mutually transmitted therebetween via the interface 21. The IC card 30 has contact points provided on the surface for making electrically connection with the interface 21. The IC card 30 also has built-in memory, and can be provided with a built-in Central Processing Unit (CPU) when necessary.

Typical Processing

When an FSK (Frequency Shift Keying) signal is transmitted from the center and received by the transceiver 11, the signal is demodulated and supplied to the encoder/decoder 12 so that identification code and data is extracted, and this identification code is compared with an identification code of the ROM 14. When both identification codes coincide, data taken from the encoder/decoder 12 is taken to be valid, and a call sound is outputted from the speaker 16 together with the received message being displayed at the LCD 18 in accordance with operations of the keys 19.

When the keys 19 are operated in a prescribed order so that a message to be transmitted to a destination is inputted to the pager, data for this message is temporarily stored in the RAM 15. When the keys 19 are operated so that the number for calling the destination pager to which a message to be transmitted is inputted and an instruction is given to execute the transmission, the transceiver 11 is brought in a transmission state, a prescribed protocol is executed and the pager is connected with the center.

When the pager is connected with the center, the identification code of the ROM 14 and data for the message stored at the RAM 15 are supplied to the transceiver 11 after being encoded by the encoder/decoder 12. The transceiver 11 converts the supplied date into a transmission signal and transmits the signal to the center. When this pager is then authenticated at the center using the identification code, message data is transmitted to the destination pager to call the destination pager and display the message.

Procedure at the Time of Updating a Balance

According to the present invention, an amount of a deposit is withdrawn from one's personal account in a financial institution and the data of the amount is transferred to the IC card 30 and the balance data of the IC card 30 is updated with the procedure of the flowchart of FIG. 3. Numerals (1) to (10) in FIG. 3 correspond to numbers of the stages (1) to (10) in the following procedure.

Namely (1) When the balance of the IC card 30 is updated, the IC card 30 is inserted into the interface 21 of the pager beforehand. The user then calls to the financial institution from an arbitrary telephone (push-button phone) and pushes the dial keys to carry out the operation of withdrawing an amount of a deposit by which the data of the deposit is transferred to the IC card 30 before hanging up.

In this case, the user inputs an account number for the deposit, a password number, an amount to be withdrawn (balance) and a pager call number etc. using the dial keys according to the audio instructions from the financial institution as an operation of withdrawing an amount.

(2) The data inputted by the user in the stage (1) are then checked by the financial institution and when this data is correct, the financial institution makes a request to the center for transmitting a withdrawal data.

(3) The center then sends a request for authentication of withdrawal and data for the withdrawal amount etc. to the pager.

(4) The pager checks the data transmitted from the center and when this is the request for authentication of the withdrawal in the stage (3), temporarily stores the transmitted data for the withdrawal amount in the RAM 15.

The pager than reads out the authentication data such as the identification code stored in the IC card 30 from the IC card 30 and sends this authentication data to the center for confirmation.

(5) The center then verifies the authentication data sent from the pager as described in the stage (4) and sends permission of writing in the withdrawal amount (updating the balance) to the pager only when the verification is successful.

(6) If the pager receives permission in the stage (5), data for the withdrawal amount stored temporarily in RAM 15 in the stage (4) is read out to be written to the memory of the IC card 30, and the balance is updated.

(7) When updating of the balance (writing of the amount to be withdrawn) is completed, this is notified to the pager from the IC card 30.

(8) When the pager receives the notification as described in the stage (7), the pager sends notification of completion of the writing of the withdrawal amount to the center.

(9) The center transmits completion of the withdrawal to the financial institution.

When the financial institution receives this withdrawal completion notification, the balance of the users account is revised at the financial institution.

(10) After the transmission of completion of the withdrawal in the stage (9), the center sends notification of completion of control to the pager.

The pager repeats transmission of the notification of completion of the writing in the stage (8) to the center until this control completion notification can be received and when this control completion can be received, the series of the withdrawal processing is completed.

The above is the procedure for when a deposit is withdrawn and the balance data of the IC card 30 is updated.

Processing for the Pager

At the pager, the balance routine 100 is executes by the CPU 131 and processing to update the balance is carried out as described above, i.e. the pager enters a wait state due to the CPU 131 usually waiting for reception of data from the center in step 101.

When data is then transmitted from the center and this is received, the process proceeds from step 101 to step 102. In step 102, a determination is made as to whether or not the data received is of the request for authentication in the stage (3). When this is of the request for authentication, the process proceeds from step 102 to step 103. Then, in step 103, the received data, i.e. data for the withdrawal amount transmitted together with the request for authentication, is temporarily stored in the RAM 15.

Following this, in step 104, the authentication data is read out from the IC card 30 via the interface 21. Next, in step 105, as described in the stage (4), this read out authentication data is supplied to the transceiver 11 after being encoded by the encoder/decoder 12 and then transmitted to the center for confirmation of the authentication.

After this, in step 111, a determination is made as to whether or not the permission of writing in the stage (5) can be received from the center. When this cannot be received, the process proceeds from step 111 to step 112, where a determination is made as to whether or not a prescribed limited period of time has elapsed from the starting of the reception check in step 111. When this time has not passed, the process returns to step 111 from step 112. The reception check occurring in step 111 is then repeatedly executed for a prescribed limited period of time.

When the permission of writing in the stage (5) can be received within this period of reception check, the process proceeds from step 111 to step 114. In step 114, as described in the stage (6), data for the withdrawal amount stored in the RAM 15 in step 103 is written in the IC card 30 via the interface 21 and the balance data of the IC card 30 is therefore updated.

The process then proceeds to step 121 where a determination is made as to whether or not completion of writing of the withdrawal amount has been notified from the IC card 30 as described in the stage (7). When this is not the case, the process proceeds from step 121 to step 122, where a determination is made as to whether or not a prescribed limited period of time has elapsed from the starting of the check in step 121. When this time has not passed, the process returns to step 121 from step 122. The check in step 121 is then repeatedly executed for the prescribed limited period of time.

When the notification of the completion of the writing in the stage (7) is received within this period of checking, the process proceeds from step 121 to step 124 where, as described in the stage (8), data showing completion of writing in the IC card 30 is transmitted to the center.

The process then proceeds to step 125 where a determination is made as to whether or not data of completion of control in the stage (10) has been received from the center. When this has not been received, the process returns to step 124 from step 125. Step 124 and step 125 are then repeated until the data of completion of control is received from the center and transmission of the data of completion of writing in the IC card 30 is repeated.

When the data of completion of control is received from the center, the series for the withdrawal process is completed. The process then returns to step 101 and the reception of data from the center is again waited.

When notification of completion of writing is not received within the limited period of time even if steps 121 and 122 are repeated, the process proceeds from step 122 to step 123 where error processing is executed so that, for example, the balance data in the IC card 30 is changed to the amount previous to execution of step 114 and the speaker 16 produces a buzzer sound notifying an error, and then the process returns to step 101.

When permission of writing data is not received within the limited period of time even if step 111 and step 112 are repeated, the process proceeds from step 112 to step 113 where error processing is executed so that, for example, the speaker 16 produces a buzzer sound notifying an error and the process then returns to step 101.

In step 102, when the data received is not of the request for authentication in the stage (3), the process proceeds from step 102 to step 130, where processing corresponding to the received data, for example, the aforementioned calling of the user is executed and the process then returns to step 101.

According to the balance routine 100, a payable amount of money in using an IC card 30, i.e. a balance data of the IC card 30, can be increased by withdrawing a deposit from a financial institution with the data of the withdrawn amount being transferred to the IC card 30.

Others

When the prescribed key inputting is carried out using the keys 19 with the IC card 30 is inserted into the interface 21 beforehand, balance data is read out from the IC card 30 and the balance of the IC card 30 is displayed at the LCD 18 with this read out data.

CONCLUSION

With the pager shown in FIG. 1, an interface 21 with an IC card 30 is provided at the pager and the balance data of the IC card 30 can be updated in accordance with data from the center. This enables the insufficient balance data in the IC card 30 to be increased even when there is no ATM nearby and makes payments using the IC card 30 always possible.

Further, the pager is originally provided for portable use and is therefore not troublesome to carry about as in a telephone adapter or an electronic wallet with a modem interface. Moreover, the balance data of the IC card 30 can be displayed at the LCD 18 even without preparing an electronic wallet.

In addition, for example, when the amount to be withdrawn is inputted by pressing the dial keys of a telephone in the stage (1), if the operation of pressing the key "*" before inputting this amount makes the balance data of the IC card 30 to be reduced by the amount of withdrawal inputted in the stage (1) at the time of carrying out the processing of the stage (6) and makes the balance amount of the financial institution to be increased by the amount of withdrawal inputted in the stage (1) at the time of carrying out the processing of the stage (9), the amount of balance stored in the IC card 30 can be returned as a deposit, i.e. the balance of the account at the financial institution can be increased.

In the above, the present invention is applied to a two-way pager but the invention can also be applied to any portable terminal capable of transmitting and receiving data such as a Personal Handy System (PHS) or a portable telephone.

According to the present invention, a deposit can be withdrawn so as to increase the insufficient balance data of an IC card even when there is no ATM nearby and payments with an IC card is always made possible. Further, a pager is originally for portable use and it is no longer necessary to carry a burdensome device such as a telephone adapter or electronic wallet with a modem interface.

What is claimed is:

1. A data processing method for processing data using a portable terminal having an interface connected to an integrated circuit card, the integrated circuit card storing identification data and value data, said method comprising:
sending, from a telephone to a financial institution, a request by a user to update the value data stored in the integrated circuit card of the portable terminal, the request including a withdrawal amount, account information, a password, and a call number of the portable terminal;
authenticating, at the financial institution, the user request;
sending, from the financial institution to a host center, the authenticated user request;
wirelessly transmitting, from the host center to the portable terminal, the authenticated user request and a further request for authentication data;
receiving, at the portable terminal, the further request for authentication data from said host center;
wirelessly transmitting, from the portable terminal to the host center, the requested authentication data;

authenticating, at the host center, the portable terminal based on the wirelessly transmitted authentication data;

wirelessly transmitting, from the host center to the portable terminal, permission for updating the value data in the integrated circuit when the portable terminal has been authenticated;

receiving, at the portable terminal, the permission for updating the value data in the integrated circuit card;

updating, by the portable terminal via the interface, an amount of the value data stored in the integrated circuit card based on the received permission and the user request;

receiving, at the portable terminal via the interface, a notification of completion of said updating of the value data stored in the integrated circuit card; and wirelessly sending, from the portable terminal to the host center, the notification of completion of said updating of the value data.

2. The data processing method of claim 1, wherein the value data is an amount of monetary value.

3. The data processing method of claim 1, wherein when the notification of completion of said updating of the value data is not received, an error processing step is executed.

4. The data processing method of claim 3, wherein said error processing step includes producing a buzzer sound.

5. The data processing method of claim 1, wherein the portable terminal is a pager.

6. A data processing method for processing data using a portable terminal having an interface connected to an integrated circuit card, the integrated circuit card storing identification data and value data, said method comprising:

receiving, at a host center from a financial institution, a request by a user to update the value data stored in the integrated circuit card of the portable terminal, the request being entered by the user using a telephone and authenticated at the financial institution, and the request including a withdrawal amount, account information, a password, and a call number of the portable terminal;

wirelessly transmitting, from the host center to the portable terminal, the user request and a further request for authentication data;

receiving, at the host center via wireless communication from the portable terminal, the requested authentication data;

authenticating, at the host center, the portable terminal based on the authentication data;

wirelessly transmitting, from the host center to the portable terminal, permission for updating the value data in the integrated circuit card when the portable terminal is authenticated, whereby the portable terminal updates, via the interface, an amount of the value data stored in the integrated circuit card based on the received permission and the user request and receives, via the interface, a notification of completion of the updating of the value data stored in the integrated circuit card; and receiving, at the host center via wireless communication from the portable terminal, the notification of completion of the updating of the value data.

7. The data processing method of claim 6, wherein the value data is an amount of monetary value.

8. The data processing method of claim 6, wherein the portable terminal is a pager.

9. A data processing method for processing data in a portable terminal having an interface connected to an integrated circuit card, the integrated circuit card storing identification data and value data, said method comprising:

receiving, at the portable terminal via wireless transmission from a host center, a request for authentication data and a user request to update the value data stored in the integrated circuit card of the portable terminal, the request being first provided to a financial institution by a user using a telephone, verified by the financial institution, and then delivered by the financial institution to the host center before the wireless transmission to the portable terminal;

wirelessly transmitting, from the portable terminal to the host center, the requested authentication data;

receiving, at the portable terminal via wireless transmission from a host center, permission for updating the value data in the integrated circuit card when the host center has authenticated the authentication data;

updating, by the portable terminal via the interface, an amount of the value data stored in the integrated circuit card based on the received permission and the user request;

receiving, at the portable terminal via the interface, a notification of completion of said updating of the value data stored in the integrated circuit card; and wirelessly transmitting, from the portable terminal to the host center, the notification of completion of the updating of the value data of the host center.

10. The data processing method of claim 7, wherein the value data is an amount of monetary value.

11. The data processing method of claim 9, wherein the portable terminal is a pager.

* * * * *

UNITED STATES PATENT AND TRADEMARK OFFICE
CERTIFICATE OF CORRECTION

PATENT NO. : 7,207,495 B2  
APPLICATION NO. : 10/799088  
DATED : April 24, 2007  
INVENTOR(S) : Shinya Haraguchi It is certified that error appears in the above-identified patent and that said Letters Patent is hereby corrected as shown below:

Column 4, line 44, "executes" should read --executed--.

Column 8, line 44, "claim 7" should read "claim 9".

Signed and Sealed this

Twenty Second Day of April, 2008

JON W. DUDAS  
*Director of the United States Patent and Trademark Office*